United States Patent Office 3,278,544
Patented Oct. 11, 1966

3,278,544
PROCESS FOR MAKING β-KETOAMINES
Nelson R. Easton, Indianapolis, Ind., assignor to Eli Lilly and Company, Indianapolis, Ind., a corporation of Indiana
No Drawing. Filed July 31, 1962, Ser. No. 213,584
3 Claims. (Cl. 260—307)

This invention relates to a novel method of synthesizing β-ketoamines and to intermediates useful in that process.

It is known in the art to prepare β-ketoamines by the hydration of β-aminoacetylenes in which only one of the carbons of the acetylenic group is substituted. In this instance, the hydrating ion attacks the carbon atom carrying the substituent. According to Kruse and Klineschmit, J. Am. Chem. Soc., 83, 216–220 (1961), however, when the remaining hydrogen is replaced by a lower alkyl group, the hydrating ion attacks the other carbon atoms of the acetylenic group and the resulting product is a γ-ketoamine; that is to say, when the hydrogen in the acetylenic group is replaced by a lower alkyl radical, the point of attack of the hydrating ion is changed from one carbon of the acetylenic group to the other. It is also known that the reaction of dry hydrogen chloride and a β-acetamidoacetylene in which the acetylenic group carries a hydrogen, results in the formation of an oxazolidine. The oxazolidine ring then opens upon treatment with water to yield the hydrochloride salt of the enol acetate of a β-ketoamine. By analogy with the hydration of the β-aminoacetylenes described above, it would be expected that when the acetylenic hydrogen in a β-acetamidoacetylene is replaced by a lower alkyl group, treatment of the latter compound with dry hydrogen chloride should yield an oxazine which, upon treatment with water, would yield in turn the enol acetate of a γ-ketoamine.

I have found quite unexpectedly that when a β-acylamidoacetylene is treated with an acid under anhydrous reaction conditions, an oxazoline is produced instead of the expected 1,3-oxazine. Upon treatment with water, the oxazoline ring opens the yield the enol acylate of a β-ketoamine which can then readily be transformed into a β-ketoamine. The reaction sequence which yields the enol acylate of the β-ketoamine constitutes one of the processes provided by this invention, and this reaction sequence is set forth in Reaction Scheme I below:

REACTION SCHEME I

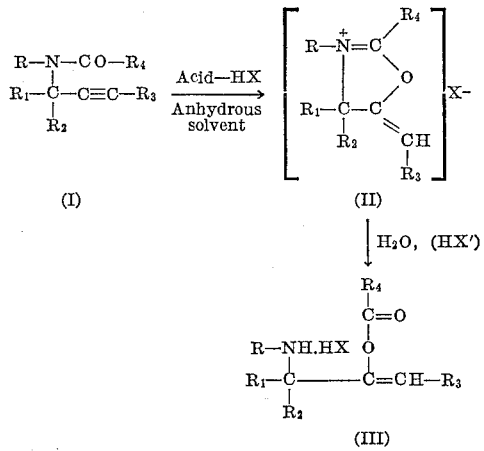

wherein R can be $C_1$–$C_{12}$ alkyl, $C_2$–$C_{12}$ alkenyl, cycloalkyl, cycloalkenyl, aralkyl, hydroxyalkyl or alkoxyalkyl; $R_1$ and $R_2$, when taken separately, can be $C_1$–$C_{12}$ alkyl, $C_2$–$C_{12}$ alkenyl, cycloalkyl, cycloalkenyl, alkoxyalkyl, aryl or substituted aryl; $R_1$ and $R_2$, when taken together with the carbon atom to which they are attached, represent polycyclic aryl, partially-hydrogenated polycyclic aryl, cycloalkyl, or cycloalkenyl; $R_3$ can be a lower alkyl group; and $R_4$ can be hydrogen, $C_1$–$C_{12}$ alkyl, $C_2$–$C_{12}$ alkenyl, cycloalkyl, cycloalkenyl, aryl, substituted aryl, or aralkyl; X is an anion and X′ is the anion of an acid having substantial water solubility. The term "substantial water solubility" is meant to include those acids which are sufficiently soluble in water to have their saturated solutions register a pH of 6 or less.

The enol acylate of a β-ketoamine produced by Reaction Scheme I can be transformed to the β-ketoamine itself by alternate pathways. On the one hand, treatment of the enol acylate with base yields the acylamide of the β-ketoamine (IV) which, upon heating with aqueous acid, hydrolyzes to yield the secondary amino ketone as an acid addition salt (V). Alternatively, treatment of the enol acylate (III) with aqueous acid, usually with heating, directly gives the same acid addition salt (V) as obtained in the first process. Finally, the β-ketoamine free base (VI) can be obtained by neutralizing an aqueous solution of the acid addition salt (V). These transformations are outlined in Reaction Scheme II below:

REACTION SCHEME II

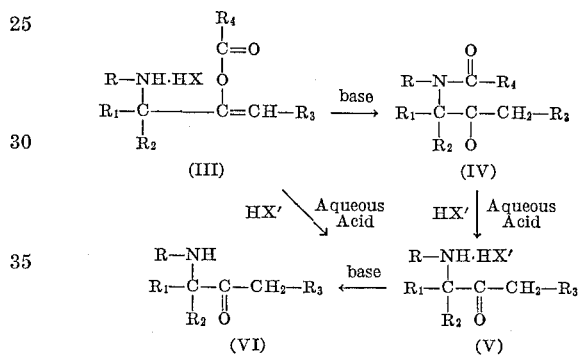

wherein R, $R_1$, $R_2$, $R_3$, $R_4$, and X′ have the same significance as hereinabove.

In Formulas I–VI above, when R, $R_1$, $R_2$, and $R_4$ represent alkyl radicals having 1–12 carbon atoms, they can be, illustratively, methyl, ethyl, isopropyl, n-butyl, sec-butyl, n-amyl, t-amyl, 3-methylpentyl, 2-ethylhexyl, n-decyl, 6-ethyldecyl, neopentyl, and the like. When R, $R_1$, $R_2$, and $R_4$ represent alkenyl radicals having from 2–12 carbon atoms, they can be, illustratively, allyl, methallyl, crotyl, 2-pentenyl, 1-methyl-3-hexenyl, 3-ethyl-1-decenyl, undecenyl, iso-octenyl and the like. When $R_1$, $R_2$, and $R_4$ represent aryl radicals, they can be any of the ring systems fulfilling the usual criteria for aromaticity. Examples of such aromatic ring systems are, illustratively, phenyl, naphthyl, thienyl, furyl, pyridyl, pyrimidyl and the like. Permissible substituents in these aromatic rings include halogens such as chlorine, bromine, and fluorine; $C_2$–$C_5$ alkyl groups such as methyl, ethyl, isopropyl, sec-butyl, t-butyl, n-amyl, iso-amyl, etc.; perhaloalkyl; amino; alkylamino; dialkylamino; acylamino; and alkoxy such as methoxy, ethoxy, propoxy, isopropoxy, n-butoxy and the like. The alkyl substituent in the alkylamino and dialkyl-amino substituting groups can be the same or different radicals such as methyl, ethyl, n-propyl, isobutyl, sec-butyl, n-amyl and the like. When the amino group is substituted with an acyl group, these acyl groups can be, illustratively, aliphatic acyl radicals such as acetyl, propionyl, acrylyl, caproyl and the like; aroyl radicals such as benzoyl, chlorobenzoyl, ethylbenzoyl, furoyl, thenoyl, nicotinoyl, and the like; or aryl-substituted aliphatic acyl radicals such as phenylacetyl, 3-phenylpropionyl, methoxyphenyl-acetyl, and the like. Illustrative aromatic or substituted aromatic radicals which $R_1$, $R_2$ and $R_4$ can represent thus include naphthyl, phenyl, β-fluoronaphthyl, 2-chlorophenyl, 2-hydroxyfuryl, 2-dimethylaminopyridyl, 3-(2-methylbutyl)pyridyl, o-, m-, and p-bromothienyl, tolyl, o-isoamylphenyl, m-xylyl, p-iodophenyl, trifluoromethylphenyl, pentafluoroethylphenyl, trichloromethylphenyl, p-(n-hexyl)phenyl, p-ethoxyphenyl, p-dimethylaminophenyl, 2-isopropylpyridyl, fluorophenanthryl, nitrothienyl, 3-methylfuryl, anisyl, etc.

In the above formulas, when R, $R_1$, $R_2$, and $R_4$ represent cycloalkyl radicals, they can be, illustratively, cyclobutyl, cyclopentyl, cyclohexyl, cycloheptyl, cyclo-octyl, methylcyclopentyl, ethylcyclohexyl, and the like. When R, $R_1$, $R_2$, and $R_4$ represent cycloalkenyl radicals, they can be, illustratively, cyclobutenyl, cyclopentenyl, 3-butylcyclohexenyl, cycloheptenyl, cyclo-octenyl and the like. $R_1$ and $R_2$, when taken together with the carbon atom to which they are attached, represent polycyclic aryl, cycloalkenyl or cycloalkyl, as for example, tetralinyl, indanyl, cyclohexyl, fluorenyl, cyclopentyl, cyclobutyl, dihydroanthranyl, thioxanthyl, xanthyl, dibenzocycloheptadienyl or dibenzocycloheptatrienyl, cycloheptyl, cyclobutenyl, cyclopentenyl, cyclohexenyl, cycloheptenyl, cyclo-octenyl, and the like. R and $R_4$ can also represent an aralkyl radical such as, illustratively, benzyl, phenethyl, 2-phenylpropyl, 2-phenylethyl, 2-tolylethyl, m-chlorobenzyl and the like, the permissible aryl radicals substituted in the alkyl chain being, in general, those defined above for R, $R_1$, $R_2$, and $R_4$. When R, $R_1$, and $R_2$, represent alkoxyalkyl radicals, they can be illustratively 12-methoxydodecyl, methoxypropyl, ethoxyethyl, isopropoxyamyl and the like. Illustrative lower alkyl radicals which $R_3$ can represent include ethyl, methyl, n-propylisopropyl, n-butyl and the like.

Among the anhydrous acids represented by HX, which furnish an anion represented by X to the oxazolinium salt, are included mineral acids, as for example, hydrochloric acid, sulfuric acid, sulfurous acid, hydrobromous acid, nitric acid, nitrous acid, phosphoric acid, and phosphorous acid, as well as organic acids, as for example, p-toluenesulfonic acid, benzoic acid, 2,4-dinitrobenzoic acid, acetic acid, trifluoroacetic acid, trichloroacetic acid and the like. In general, I prefer to employ those acids which have an ionization constant equal to or greater than that of acetic acid; that is to say, those acids which have an ionization constant of 4.5 or lower.

In the above formulas, acids represented by HX' are those which have a substantial water solubility and include a majority of those listed above as representative of HX' as well as other related acids.

Considered in more detail, the process set forth in Reaction Scheme I above, wherein a β-acrylamidoacetylene (I) is treated with an acid under anhydrous conditions to form an oxazolinium compound (II) which is then converted by water or aqueous acid to a salt of β-acylenolate of a secondary amine (III), is carried out as follows: In the first step, the β-acylamidoacetylene (I) is dissolved in an anhydrous solvent such as diethyl ether, ethyl acetate, benzene, and the like. An anhydrous acid, represented by HX in the above reaction scheme is added to this solution. As previously stated, the added acid, HX, can be any acid; however, certain acids are more readily obtainable in anhydrous condition than others, as for example, hydrochloric acid, hydrobromic acid, p-toluenesulfonic acid, etc., and these acids are more conveniently employed in this first step of the process than are others which are obtained in anhydrous form only with difficulty.

Since anhydrous conditions are employed for the conversion of the β-acylamidoacetylene to the oxazolinium compound, it is possible to employ as a catalyst a type of acid which does not yield one or more hydrogen ions upon solution a water; i.e., a Lewis acid, as for example boron trifluoride, as such or in the form of its etherate; aluminum chloride; diborane; and the like. These Lewis acids can be used to catalyze the addition of the oxygen of the acyl group to the β-carbon of the acetylene group to yield an intermediate oxazolinium compound, and are the full equivalent of the proton-containing acids—HX, as defined above—for the purpose of catalyzing the process.

As would be expected, the stronger the acid employed as a catalyst, the more rapid the conversion of the β-acylamido compound to the oxazolinium salt. Thus, with weaker acids, a longer reaction time or a higher reaction temperature is necessary to accomplish the desired conversion to the same extent in the same length of time as would be required, for example, by a stronger acid such as a mineral acid.

The second step of the two-step process of Reaction Scheme I is readily accomplished by the addition of water to the oxazolinium compound (II) since, in most instances, the oxazolinium salt is itself sufficiently acidic to catalyze the opening of the oxazoline ring to form the β-enol acylate. Furthermore, if the acidic catalyst, HX, in the first step is included within the group of water-soluble acids represented by HX', it is not necessary to add an auxiliary acid at this point in the reaction in order to have the enol acylate product present in the form of a salt. However, if the acid used to catalyze the formation of the oxazolinium compound is water-insoluble or is decomposed by water, as in the case of the Lewis acids disclosed above, it is necessary to add a water-soluble acid, HX', at this point in order to form a stable salt of the β-enol acylate.

Since acid is used to convert the β-acylamidoacetylene to a oxazolinium compound, and since aqueous acid is used to open the oxazolinium ring to form the enol acylate, it might be thought that direct treatment of the β-acylamidoacetylene with aqueous acid would yield the same product. It has been found, however, that this latter reaction yields instead an ene-yne formed by the elimination of the amine group from the β-acylaminoacetylene.

Reaction Scheme II above sets forth, by way of structural formulas, another set of processes provided by this invention. According to Reaction Scheme II, the β-enol acylate (III), which is the end product of Reaction Scheme I, undergoes various transformations upon treatment with acid or base, and these transformations provide alternate pathways for the preparation of acid addition salts of β-ketoamines, the preparation of which class of compounds is the chief object of this invention. More specifically, as set forth in Reaction Scheme II, the β-enol acylate (III), upon treatment with an aqueous base such as sodium hydroxide, potassium hydroxide, magnesium hydroxide, calcium hydroxide, ammonium hydroxide, tetramethylammonium hydroxide and the like, undergoes a rearrangement in which the acyl group shifts from the oxygen of the ketone (in its enol form) to the amine nitrogen to form a β-acylamido ketone. The β-ketoamine is then produced by heating the β-acylamido ketone with aqueous acid. Heat is necessary in carrying out this hydrolysis in order to obtain a substantial quantity of the desired β-ketoamine in a reasonable length of time. In addition, although any water-soluble acid having an acid strength greater than that of the acid forming the amido group can be employed in the hydrolysis step, I prefer to use mineral acids such as hydrochloric acid or sulfuric acid or their organic equivalent such as p-toluenesulfonic acid, trifluoroacetic acid and the like. The length of time necessary for hydrolyzing the amide group depends, of course, on the acid strength of the acid used, on the temperature of the hydrolysis reaction, and on the nature of the amide grouping. Ordinarily, even under favorable conditions, reaction periods of one day or longer are necessary to obtain substantial quantities of the hydrolyzed amine.

As would be expected, direct treatment of the enol acylate (III) with aqueous acid under the reaction conditions outlined above yields directly the β-ketoamine (V) in the form of its acid addition salt, and this direct treatment provides an alternate synthetic path for the preparation of this latter compound. The β-ketoamine free base can then be formed by contacting an aqueous solution of the acid addition salt of the amino ketone with alkali. The free base is, of course, insoluble in the aqueous alkaline solution and separates as an oil, in which form it can be extracted into ether or other water-immiscible organic solvent. The ether extracts are then dried and the solvent is removed by evaporation or distillation, leaving the β-ketoamine free base as a residue. The residue is usually purified by distillation, but can also be purified by conversion of the free base to the corresponding acid addition salt, which salt is purified by recrystallization.

It is apparent from the above discussion that prolonged heating of the oxazolinium salt (II) with an aqueous mineral acid will yield directly the acid addition salt of the β-ketoamine (VI) without the necessity of isolating the intermediate enol acylate (III).

An alternative process is available for the synthesis of the β-keto amides (IV in Reaction Scheme II). This reaction involves the treatment of an acylamido acetylene with a heavy metal catalyst in a mutual solvent. In certain solvents, such as dimethylformamide or less often a lower aliphatic alcohol, an intermediate oxazolidine (or with secondary amides, an oxazoline) can be isolated. Treatment of the oxazolidine with water then yields the β-keto amide. The β-keto amide is formed directly in most instances when aqueous solvents are employed, or when the acyl group is derived from an aromatic acid. Among the heavy metal catalysts which are useful in catalyzing the above reaction are salts of silver, mercury, copper, and the like.

The β-ketoamines furnished by the processes of this invention have a useful pharmacological effect upon the central nervous system when administered to standard laboratory animals. In particular, many of the compounds cause a significant lowering of blood pressure in such animals. In addition, the compounds are useful as starting materials for the synthesis of various substituted morpholines as set forth in the co-pending application of Easton and Dillard Serial No. 213,581, filed this even date, now U.S. Patent 3,225,042, issued Dec. 21, 1965.

The following examples illustrate the processes of this invention:

EXAMPLE 1

*Preparation of N-methyl-4-acetamido-4-methyl-3-pentanone*

Twenty grams of N-methyl-4-acetamido-4-methyl-2-pentyne were dissolved in 500 ml. of ethyl acetate. Anhydrous gaseous hydrogen chloride was bubbled into the solution, thus forming 2,3,4,4-tetramethyl-5-ethylidene-2-oxazolinium chloride which was recovered by filtration. Recrystallization of the solid oxazolinium chloride from methyl ethyl ketone yielded purified 2,3,4,4-tetramethyl-5-ethylidene-2-oxazolinium chloride which melted at about 118–120° C. The nuclear magnetic resonance spectrum of the crystalline product verified its cyclic structure.

Ten grams of 2,3,4,4-tetramethyl-5-ethylidene-2-oxazolinium chloride were dissolved in water and the resulting mixture was heated to about 60° C. The reaction mixture was then made basic to litmus by the addition of 45 percent (w./v.) aqueous sodium hydroxide, thus forming N-methyl-4-acetamido-4-methyl-3 - pentanone. The ketone was extracted into ether. The ether solution was dried and fractionally distilled. N-methyl-4-acetamido-4-methyl-3-pentanone boiled at about 130° C. at a pressure of about 5 mm. of Hg. The nuclear magnetic resonance spectrum and infrared spectrum both confirmed the keto amide structure of the produce.

EXAMPLE 2

*Preparation of 4-methylamino-4-methyl-3-pentanone*

Forty grams of N - methyl - 4-acetamido-4-methyl-2-pentyne were dissolved in 500 ml. of ethyl acetate. Anhydrous gaseous hydrogan chloride was bubbled into the solution until it gave a strong acidic reaction. 2,3,4,4-tetramethyl-5 - ethylidene - 2 - oxazolinium chloride was formed during this process. The reaction mixture was concentrated in vacuo. A small amount of solid separated during this evaporation. The solid was dissolved in ethanol and the ethanolic solution was added to the etheral concentrate. Two hundred milliliters of water were added to the combined concentrates, followed by 50 ml. of 12 N hydrochloric acid. The reaction mixture was heated at refluxing temperature for another 14 hours. 2,3,4,4-tetramethyl-5-ethylidene-2 - oxazolinium chloride was converted by this treatment to 4 - methylamino - 4-methyl-3-pentanone. The reaction mixture was cooled to about 25° C. and 100 g. of ice were added followed by sufficient 45 percent aqueous sodium hydroxide to make the reaction mixture basic. An excess of solid potassium carbonate was added and the mixture was shaken thus saturating the solution with respect to potassium carbonate. 4-Methylamino-4-methyl-3-pentanone free base, being insoluble in the alkaline layer, separated and was extracted into ether. The ether extract was separated, dried and distilled. 4-Methylamino-4-methyl-3-pentanone boiled in the range 96–98° C. at a pressure of about 70 mm. of Hg.

The first step of the above reaction can be carried out in ethanol solution as well as in ethyl acetate with substantially the same results.

EXAMPLE 3

*Preparation of 4-ethylamino-4-methyl-3-acetoxy-2-pentene hydrochloride*

Five grams of N-ethyl-4-acetamido-4-methyl-2-pentyne were dissolved in 150 ml. of ethyl acetate. Anhydrous gaseous hydrogen was bubbled into the solution. An oily layer separated. The reaction mixture was allowed to remain at ambient room temperature for 14 hours, during which time the oily layer solidified. Recrystallization of the resulting solid from methyl ethyl ketone yielded 4-ethylamino-4-methyl-3-acetoxy-2-pentene hydrochloride melting at about 146–148° C.

*Analysis.*—Calc.: C, 54.16; H, 9.09. Found: C, 53.91; H, 9.25.

EXAMPLE 4

*Preparation of 4-ethylamino-4-methyl-3-pentanone hydrochloride*

About 1 g. of N-ethyl-4-acetamido-4-methyl-2-pentyne was dissolved in 40 ml. of ether, and anhydrous gaseous hydrogen chloride was bubbled into the solution. Ten milliliters of water and 20 ml. of ether were added. The reaction mixture was concentrated in vacuo. Ten additional milliliters of water were added to the concentrate and the resulting mixture was heated to about 90° C. for about four hours. The reaction mixture was evaporated to dryness in vacuo. The resulting residue was dissolved in water and the water layer was made basic by the addition of 45 percent sodium hydroxide. 4-ethylamino-4-methyl-3-pentanone formed in the above reaction was insoluble in the basic layer and separated. The free base was taken up in ether, the ether extract was separated and dried, and the ether was removed by evaporation in vacuo, leaving as a residue 4-ethylamino-4-methyl-3-pentanone mixed with a small amount of N-ethyl-4-acetamido-4-methyl-3-pentanone. The solid residue was dissolved in anhydrous ether, and anhydrous gaseous hydrogen chloride was bubbled into the solution, thus forming the hydrocholride salt of 4-ethylamino-4-methyl-3-pentanone. The hydrochloride salt was separated by filtration and purified by recrystallization from a mixture of methyl ethyl ketone and ethyl acetate.

EXAMPLE 5

*Preparation of 4-methylamino-4-methyl-3-pentanone*

Twenty grams of N-methyl-4-acetamido-4-methyl-3-pentanone were dissolved in 100 ml. of 10 percent aqueous hydrochloride acid. The resulting mixture was heated to about 100° C. for about 4 hours. The reaction mixture was cooled and was made basic by the addition of 45 percent aqueous sodium hydroxide, thus forming 4-methylamino-4-methyl-3-pentanone, which, being insoluble in the aqueous alkaline layer, formed a separate phase. The free base was extracted into ether, the ether extract was separated and dried, and the ether was removed by distillation in vacuo. The resulting residue, containing 4-methylamino-4-methyl-3-pentanone, was distilled and the fraction boiling at 44–46° C. at a pressure of about 5 mm. of Hg was collected.

EXAMPLE 6

*Preparation of 4-ethylamino-4-methyl-3-(p-chlorobenzoyloxy)-2-pentene hydrochloride*

A mixture containing 22.5 g. of 4-methylamino-4-methyl-2-pentyne and 40 ml. of triethylamine was cooled to about 20° C. Thirty-five grams of p-chlorobenzoyl-chloride were added slowly with stirring to the solution while keeping the temperature below about 30° C. Chloroform was added from time to time to maintain the reaction in a fluid state. After the acid chloride addition had been completed, the reaction mixture was permitted to attain ambient room temperature while a stirring was continued. One hundred milliliters of water were added, followed by 100 ml. of 10 percent aqueous sodium hydroxide. The reaction mixture was filtered; the chloroform layer was separated and dried; and the chloroform was removed by evaporation in vacuo. The residue, containing N-methyl - 4 - p-chlorobenzamido - 4-methyl-2-pentene formed in the above reaction, was dissolved in hexane. The hexane solution was filtered, decolorized with activated charcoal, and concentrated in vacuo. Crystalline N-methyl - 4 - p-chlorobenzamido - 4-methyl-2-pentene precipitated from the concentrate upon cooling. The compound melted at about 32–34° C.

*Analysis.*—Calc.: C, 67.33; H, 6.45. Found: C, 67.40; H, 6.66.

Following the procedure of Example 3, 15 g. of N-methyl-4-p-chlorobenzamido-4-methyl-2-pentene were dissolved in 150 ml. of ethyl acetate and the solution was saturated with anhydrous gaseous hydrogen chloride. The reaction mixture was evaporated to dryness in vacuo, and the resulting residue, comprising 3,4,4-trimethyl - 5 - ethylidene - 2 - (p - chlorophenyl) - 2 - oxazolinium chloride, was crystallized from an ethyl acetate-ether solvent mixture. The compound was extremely hygroscopic. A nuclear magnetic resonance spectrum of the compound was consistent with the assigned formula. 3,4,4 - trimethyl - 5 - ethylidene - 2 - p - chlorophenyl-2-oxazolinium chloride thus prepared was dissolved in a mixture containing 50 ml. of ethanol and 100 ml. of water. The solvents were removed by evaporation in vacuo. The residue, comprising 4-methylamino-4-methyl-3-(p-chlorobenzoyloxy)-2-pentene hydrochloride, was crystallized from a mixture of benzene and ethanol. Recrystallization of the solid salt from a mixture of isopropyl alcohol and ethyl acetate yielded purified 4-methylamino - 4 - methyl - 3 - (p - chlorobenzoyloxy)-2-pentene hydrochloride melting at about 173–175° C.

*Analysis.*—Calc.: C, 55.27; H, 6.29. Found: C, 55.30; H, 6.47.

EXAMPLE 7

*Preparation of 5-methylamino-5-methyl-4-acetoxy 3-hexene hydrochloride*

Following the procedure of Example 6, 5-methylamino-5-methyl-3-hexyne has reacted with acetyl chloride in the presence of triethylamine and chloroform to yield N-methyl-5-acetamido-5-methyl-3-hexyne boiling at about 70° C. at a pressure of about 5 mm. of Hg.

*Analysis.*—Calc.: C, 71.81; H, 10.24. Found: C, 72.01; H, 10.35.

Fifteen grams of N-methyl-5-acetamido-5-methyl-3-hexyne were dissolved in a mixture containing 100 ml. of ethyl acetate and 150 ml. of ether. The reaction mixture was saturated with anhydrous hydrogen chloride. An extremely hygroscopic solid precipitated. The solid was collected by filtration and dissolved in a mixture of ethanol, water, and benzene. The solvents were removed by evaporation in vacuo and the residue, comprising 5-methylamino-5-methyl - 4 - acetoxy - 3 - hexene hydrochloride, was crystallized from ethyl acetate. The compound melted at about 119–121° C.

*Analysis.*—Calc.: C, 54.17; H, 9.09. Found: C, 54.14; H, 9.23.

5-methylamino-5-methyl - 4 - acetoxy-3-hexene hydrochloride was converted to 2-methylamino-2-methyl-3-hexanone by the following procedure: The hydrochloride salt was dissolved in ethyl acetate. A mixture containing four parts of water and one part of 12 N hydrochloric acid was added and the resulting mixture was heated. The reaction mixture was made basic by saturating it with potassium carbonate. The free base thus produced was extracted into ether and the ether was removed by evaporation in vacuo. The free base was then converted back to the hydrochloric salt which was crystallized from a mixture of ethyl acetate and ether.

The preparation of the starting materials used in the above syntheses is carried out by the acylation of a secondary acetylenic amine as furnished by the method of Hennion and Perrino J. Org. Chem. 26, 1073 (1961).

Examples 6 and 7 contain illustrative synthetic procedures and the following preparation further illustrates the procedures for acylating an acetylenic amine.

PREPARATION 1.—N-ETHYL-4-ACETAMIDO-4-METHYL-2-PENTYNE

Ten grams of 4-ethylamino-4-methyl-2-pentyne were dissolved in 50 ml. of ether. Tel milliliters of acetic anhydride were added and the mixture was heated to a temperature of about 60–65° C. for a period of 10 minutes. The reaction mixture was poured into 200 ml. of water, and the aqueous solution was made basic by the addition of 45 percent aqueous sodium hydroxide. N-ethyl-4-acetamido-4-methyl-2-pentyne formed in the above reaction was extracted into ether and the ether extract was separated and dried. The ether was removed by evaporation in vacuo and the residue, comprising N-ethyl-4-acetamido-4-methyl-2-pentyne, was purified by distillation. The fraction boiling in the range 92–98° C. at a pressure of about 5 mm. of Hg was collected; $n_D^{25} = 1.466$.

*Analysis.*—Calc.: C, 71.81; H, 10.25; N, 8.38. Found: C, 71.76; H, 10.38; N, 8.34.

N-methyl-4-acetamido-4-methyl-2-pentyne was prepared in a similar fashion from 4-methylamino-4-methyl-2-pentyne and acetic anhydride. The compound distilled in the range 84–88° C. at a pressure of about 5 mm. of Hg; $n_D^{25} = 1.470$.

Other acylating agents, for example, propionic anhydride, acetyl chloride, benzoyl chloride, phenylacetyl chloride, 2,4-dinitrobenzoyl chloride, lauryl chloride, lauric anhydride, dodecenoyl chloride, and the like, can be substituted for acetic anhydride in the above preparation to yield the corresponding acylated derivatives. Similarly, many other hindered secondary acetylenic amines having the formula:

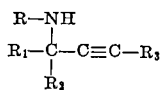

wherein R, $R_1$, $R_2$, and $R_3$ have the same meaning as hereinabove, can be used in place of the acetylenic amine of the above example to yield the desired acylated secondary acetylenic amine starting materials.

The following reactions are illustrative of those which can be carried out by the various processes provided by this invention.

N-ethyl-5-methyl-5-benzamido-3-hexyne is reacted in ether with dry HCl to yield 3-ethyl-4,4-dimethyl-2-phenyl-5-propylidene oxazolinium chloride which on treatment with water gives 2-ethylamino-2-methyl-3-benzoyloxy-3-hexene hydrochloride.

4-propionamido-4-methylundec-10-en-2-yne is reacted in ethanol with anhydrous sulfuric acid to yield bis[2-ethyl-4-methyl-4-($\Delta^6$-heptenyl)-5-methylene oxazolinium] sulfate which on treatment with water gives 4-amino-4-methyl-3-propionoxy-2,10-undecadiene sulfate.

N-n-butyl-4-acetamido-4-methyl-2-pentyne is reacted with anhydrous hydrogen bromide in dioxane to yield 2,4,4-trimethyl-3-n-butyl-5-methylene oxazolinium bromide which on prolonged heating with 10 percent aqueous hydrobromic acid gives 4-n-butylamino-4-methyl-3-pentanone hydrobromide.

4-dodecylamino-4-methyl-3-p-methoxybenzoyloxy - 2-heptene phosphate on treatment with aqueous potassium hydroxide yields N-dodecyl-4-p-methoxybenzamido-4-methyl-3-heptanone.

I claim:

1. The process for preparing β-ketoamines, which comprises treating with an anhydrous acid, HX, having an ionization constant of at least 4.5, in a nonaqueous solvent, an acylamidoacetylene of the following formula:

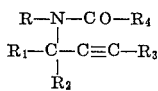

wherein R is a member of the group consisting of $C_1$-$C_{12}$ alkyl, $C_2$-$C_{12}$ alkenyl, $C_4$-$C_8$ cycloalkyl, $C_4$-$C_8$ cycloalkenyl, monocyclic aryl-substituted lower alkyl, hydroxy $C_1$-$C_{12}$ alkyl and lower alkoxy $C_1$-$C_{12}$ alkyl; $R_1$ and $R_2$, when taken separately, are members of the group consisting of $C_1$-$C_{12}$ alkyl, $C_2$-$C_{12}$ alkenyl, $C_4$-$C_8$ cycloalkyl, $C_4$-$C_8$ cycloalkenyl, lower alkoxy $C_1$-$C_{12}$ alkyl, and monocyclic and bicylic aryl and substituted aryl, said aryl substituents being selected from the group consisting of nitro, halogen, $C_1$-$C_5$ alkyl, perhalo lower alkyl, amino, lower alkyl amino, di-lower alkyl amino, aliphatic acyl amino, aroyl amino, and lower alkoxy; $R_1$ and $R_2$, when taken together with the carbon atom to which they are attached, form cyclic hydrocarbon; $R_3$ represents a lower alkyl group; and $R_4$ is a member of the group consisting of hydrogen, $C_1$-$C_{12}$ alkyl, $C_2$-$C_{12}$ alkenyl, $C_4$-$C_8$ cycloalkyl, $C_4$-$C_8$ cycloalkenyl, monocyclic aryl-substituted lower alkyl, and monocyclic and bicyclic aryl and substituted aryl, said aryl substituents being chosen from the group consisting of nitro, halogen, $C_1$-$C_5$ alkyl, perhalo lower alkyl, amino, lower alkyl amino, di-lower alkyl amino, aliphatic acyl amino, aroyl amino, and lower alkoxy; and X is the anion provided by said anhydrous acid, thereby forming an oxazolinium salt of the following formula:

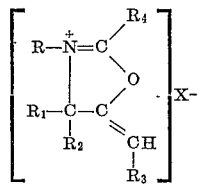

wherein R, $R_1$, $R_2$, $R_3$, $R_4$ and X have the same meaning as hereinabove; contacting said oxazolinium salt with water to produce an acid addition salt of an enol acylate of a β-ketoamine having the following formula:

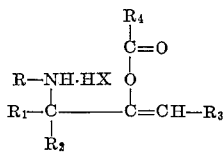

wherein R, $R_1$, $R_2$, $R_3$, $R_4$ and X have the same significance as hereinabove; heating said enol acylate in the presence of an aqueous acid, HX, having an ionization constant of at least 4.5, to produce an acid addition salt of a β-ketoamine having the following formula:

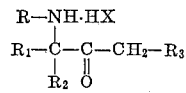

wherein X, R, $R_1$, $R_2$ and $R_3$ have the same significance as hereinabove; contacting said acid addition salt with aqueous alkali to form the corresponding β-ketoamine free base; and then isolating said free base.

2. In a process for preparing β-ketoamines, the process step which comprises treating with an anhydrous acid, HX, having an ionization constant of at least 4.5 in a nonaqueous solvent an acylamidoacetylene of the following formula:

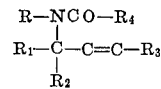

wherein R is a member of the group consisting of $C_1$-$C_{12}$ alkyl, $C_2$-$C_{12}$ alkenyl, $C_4$-$C_8$ cycloalkyl, $C_4$-$C_8$ cycloalkenyl, monocyclic aryl substituted lower alkyl, hydroxy $C_1$-$C_{12}$ alkyl and lower alkoxy $C_1$-$C_{12}$ alkyl; $R_1$ and $R_2$, when taken separately, are members of the group consisting of $C_1$-$C_{12}$ alkyl, $C_2$-$C_{12}$ alkenyl, $C_4$-$C_8$ cycloalkyl, $C_4$-$C_8$ cycloalkenyl, lower alkoxy $C_1$-$C_{12}$ alkyl, and monocyclic and bicyclic aryl and substituted aryl, said substituents being selected from the group consisting of nitro, halogen, $C_1$-$C_5$ alkyl, perhalo lower alkyl, amino, lower alkyl amino, di-lower alkyl amino, aliphatic acyl amino, aroyl amino, and lower alkoxy; $R_1$ and $R_2$, when taken together with the carbon atom to which they are attached, form a cyclic hydrocarbon; $R_3$ represents a lower alkyl group; and $R_4$ is a member of the group consisting of hydrogen, $C_1$-$C_{12}$ alkyl, $C_2$-$C_{12}$ alkenyl, $C_4$-$C_8$ cycloalkyl, $C_4$-$C_8$ cycloalkenyl, monocyclic aryl substituted lower alkyl, and monocyclic and bicyclic aryl and substituted aryl, said aryl substituents being chosen from the group consisting of nitro, halogen, $C_1$-$C_5$ alkyl, perhalo lower alkyl, amino, lower alkyl amino, di-lower alkyl amino, aliphatic acyl amino, aroyl amino, and lower alkoxy; and X is the anion provided by said anhydrous acid, to form an oxazolinium salt of the following formula:

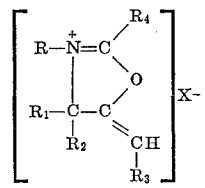

wherein R, $R_1$, $R_2$, $R_3$, $R_4$ and X have the same meaning as hereinabove.

3. In a process for preparing β-ketonamines, the process step which comprises treating with water an oxazolinium salt of the following formula:

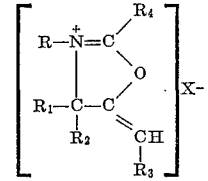

wherein R is a member of the group consisting of $C_1$-$C_{12}$ alkyl, $C_2$-$C_{12}$ alkenyl, $C_4$-$C_8$ cycloalkyl, $C_4$-$C_8$ cycloalkenyl, monocyclic aryl-substituted lower alkyl, hydroxy $C_1$-$C_{12}$ alkyl and lower alkoxy $C_1$-$C_{12}$ alkyl; $R_1$ and $R_2$, when taken separately, are members of the group consisting of $C_1$–$C_{12}$ alkyl, $C_2$–$C_{12}$ alkenyl, $C_4$–$C_8$ cycloalkyl, $C_4$–$C_8$ cycloalkenyl, lower alkoxy $C_1$–$C_{12}$ alkyl, and monocyclic and bicyclic aryl and substituted aryl, said aryl substituents being selected from the group consisting of nitro, halogen, $C_1$–$C_5$ alkyl, perhalo lower alkyl, amino, lower alkyl amino, di-lower alkyl amino, aliphatic acyl amino, aroyl amino, and lower alkoxy; $R_1$ and $R_2$, when taken together with the carbon atom to which they are attached, form cyclic hydrocarbon; $R_3$ represents a lower alkyl group; and $R_4$ is a member of the group consisting of hydrogen, $C_1$–$C_{12}$ alkyl, $C_2$–$C_{12}$ alkenyl, $C_4$–$C_8$ cycloalkyl, $C_4$–$C_8$ cycloalkenyl, monocyclic aryl-substituted lower alkyl, and monocyclic and bicyclic aryl and substituted aryl, said aryl substituents being chosen from the group consisting of nitro, halogen, $C_1$–$C_5$ alkyl, perhalo lower alkyl, amino, lower alkyl amino, di-lower alkyl amino, aliphatic acyl amino, aroyl amino, and lower alkoxy; and X is the anion of an acid having an ionization constant of at least 4.5, to produce an enol acylate of the following formula:

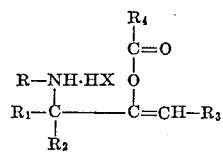

wherein R, $R_1$, $R_2$, $R_3$, $R_4$ and X have the same significance as hereinabove.

References Cited by the Examiner

Skita et al.: Ber. vol. 66B, pp. 865–66 (1933).
Stevens et al.: J. Am. Chem. Soc. vol. 84, pp. 272–4, June 5, 1962.

ALEX MAZEL, *Primary Examiner.*

HENRY R. JILES, NICHOLAS S. RIZZO, *Examiners.*

RICHARD J. GALLAGHER, ALTON D. ROLLINS,
*Assistant Examiners.*